United States Patent Office 3,407,128
Patented Oct. 22, 1968

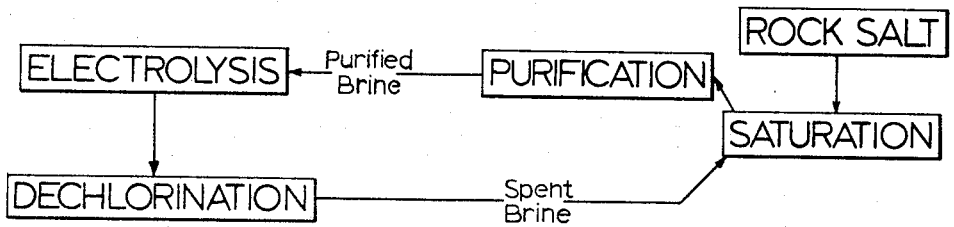
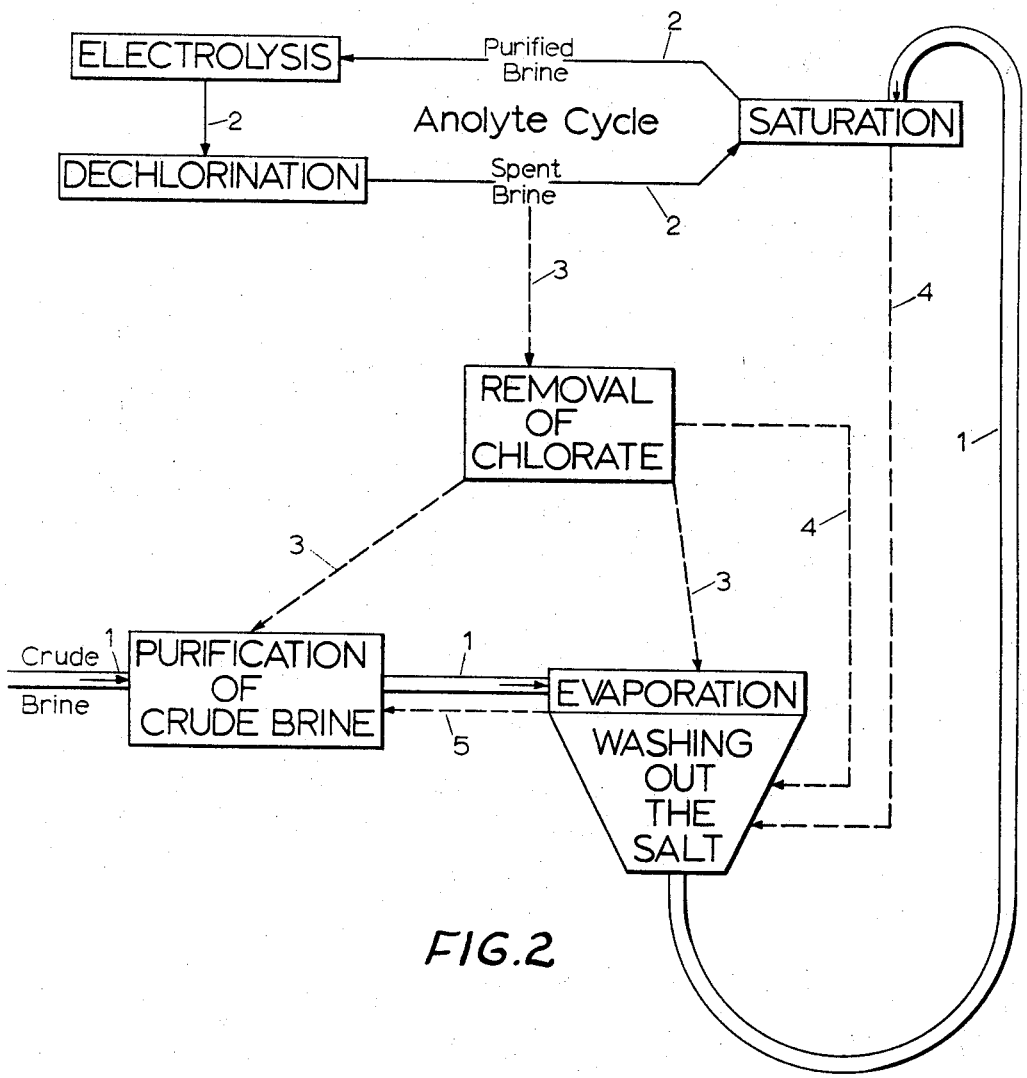

3,407,128
PROCESS FOR THE MANUFACTURE OF CHLORINE, SODIUM HYDROXIDE AND HYDROGEN BY THE ELECTROLYSIS OF SODIUM CHLORIDE IN MERCURY CELLS
Alfred Goerg, Blonay, Vaud, Switzerland, assignor to Ciba Limited, Basel, Switzerland, a company organized under the laws of the Swiss Confederation
Continuation-in-part of application Ser. No. 299,976, Aug. 5, 1963. This application Mar. 13, 1967, Ser. No. 622,600
3 Claims. (Cl. 204—99)

ABSTRACT OF THE DISCLOSURE

Chlorine, sodium hydroxide and hydrogen are manufactured by electrolyzing a saturated, purified aqueous sodium chloride solution in a mercury cathode cell having an associated anolyte cycle. Crude borine is purified and concentrated by evaporation thereby precipitating sodium chloride. The sodium chloride is washed to remove sulphate ions and conveyed to a saturation plant by a part of the anolyte cycle brine to resaturate spent brine. The concentrated crude brine is recycled to the purifying stage. A small amount of spent brine is treated to remove chlorate and mercury ions and introduced into the purifying and/or evaporating stage.

Cross reference

This application is a continuation-in-part of applicant's copending application Ser. No. 299,976, filed Aug. 5, 1963, and now abandoned, the disclosure of which is relied on and incorporated by reference in this application.

Background

Several processes are known for the production of chlorine, sodium hydroxide and hydrogen from sodium chloride by electrolysis. These include the diaphragm process, the combined diaphragm/mercury cell process and the process that operates solely with mercury cells.

When sodium chloride cannot be obtained in the form of rock salt or, in dissolved form, as sea salt, but is available only in the form of crude brine, the only economic method of carrying out the electrolysis has hitherto been the so-called diaphragm process. In the diaphragm process purified brine is used which is decomposed by electrolysis to form a caustic solution generally containing 10 to 15% of NaOH and up to 15% of NaCl. To produce a concentrated sodium hydroxide solution from this, the solution is evaporated to a content of NaOH of about 50%, during which most of the less soluble sodium chloride is separated. However, sodium hydroxide solution obtained in this manner always contains at least 1 to 1.5% of NaCl, which, for some purposes, is a tolerable quantity of impurity but, for other uses, especially in the manufacture of viscose rayon, a pure sodium hydroxide solution is required, that is to say, one that contains less than 0.1% of NaCl. If such a pure solution is to be obtained from a caustic solution prepared by the diaphragm process, the caustic solution has to be subjected to a special and costly purification process.

When the sodium chloride is available in the form of solid salt, the so-called mercury cell process is the most economical one to operate; moreover, the sodium hydroxide solution is produced directly in a very pure form. However, in order to operate a mercury cell the sodium chloride used has to have a very high degree of purity. Alkaline earths, especially magnesium, can reduce the overvoltage to such an extent that a substantial amount of hydrogen accumulates at the cathode in addition to the sodium amalgam that is formed. In addition to this, mixture of amalgams are formed in the presence of alkaline earths and iron, and these have to be removed. For these reasons, the main problem in the production of sodium hydroxide solution by the mercury cell process is the availability of highly purified sodium chloride solution. One possibility is to use sodium chloride obtained from the diaphragm process. This salt, which is already fairly pure, can be brought to the degree of purity required by the mercury cell process relatively easily. Thus, a combined diaphragm/mercury cell process can be operated in plants utilizing the diaphragm process.

The principle of a mercury cell is that a saturated and very pure sodium chloride solution (purified brine) is electrolytically decomposed by means of a fluid mercury cathode and a solid graphite anode. Sodium accumulates at the mercury cathode and dissolves in the mercury to form an amalgam. The amalgam remains fluid, and with a sodium content of up to 0.4% flows continuously to a decomposition compartment where it is decomposed with water to form a sodium hydroxide solution of a concentration up to 75%, hydrogen being liberated. Chlorine is freed at the anode. Normally, the pure brine initially used contains 300 to 310 grams of NaCl per liter and, after electrolysis, it contains 250 to 270 grams of NaCl per liter. This solution is known as "spent brine." The spent brine flows continuously out of the cell, is freed from chlorine, is saturated with sodium chloride, purified and then returned to the cell. Pure, brine and spent brine form what is termed the anolyte and the cycle including the electrolysis, dechlorination and saturation stages is termed the anolyte cycle.

In mercury cell processes, which operate on rock salt and in which rock salt is used to saturate the spent brine, the brine must be purified at a point between the saturation plant and the electrolytic cell, that is to say, in the anolyte cycle. A diagram of this arrangement is shown in FIG. 1. The magnesium ion content of the anolyte should never exceed 0.01 gram per liter, whereas a concentration of 2 to 3 grams of $CaSO_4$ or 2 to 5 grams of $Na_2SO_4$ can be tolerated. There are several drawbacks to purification between saturation and electrolysis. Since the total amount of anolyte, which includes the spent brine which is in itself pure, always has to be purified after saturation, a relatively large amount of liquid has to pass through the purifying plant. Accordingly, extensive apparatus with large filter surfaces or settling tanks is required. If the rock salt contains a high proportion of magnesium and sulfate, special difficulties arise in the purification process, and precipitation of the sulfate ions with barium ions is expensive. It is also a disadvantage if the electrolysis has to be interrupted due to trouble of the purification process.

In areas where the sodium chloride is obtainable only in the form of crude brine, economic operation of sodium chloride electrolysis exclusively by the mercury cell process is only possible if the crude brine can be converted into very pure sodium chloride in an advantageous manner.

Such a process is particularly economic if a fraction of the spent brine leaving the electrolytic cell can be put to practical use in the evaporation or in the purification process. The combination of these steps makes the purification of the concentrated brine in the anolyte cycle before entering the cells superfluous. An object of the present invention is to solve these problems.

Purification of crude brine is generally carried out by the conventional, discontinuous lime-soda process after which the pure brine is concentrated by evaporation, the precipitated sodium chloride is separated in a centrifuge and washed. However, this process requires complicated apparatus, is partly discontinuous, and the saturated anolyte still has to be subjected to another purification process because the initial purification process does not remove sulphate ions.

Brief summary

According to the present invention a specially advantageous sodium chloride electrolysis can be carried out when the crude brine is purified outside the anolyte cycle, concentrated by evaporation, and the spent brine is saturated with the precipitated and very pure sodium chloride.

Detailed description

In the present process intermediate purification in the anolyte cycle, that is to say, purification of the saturated brine before it passes to the cell for electrolysis, is no longer necessary. Apart from ensuring troublefree operation of the electrolysis, this means that the total amount of spent brine, which in respect of its content of troublesome metal ions is substantially pure, does not have to be included in a purification step as was previously the case. The amount of liquid to be transported for purification purposes is thus greatly reduced, and the purification plant can be designed to process the crude brine only.

The expression "purification" means a chemical purification of the crude brine. It involves removal of troublesome metals such as alkaline earth metals, especially magnesium and calcium, and heavy metals such as iron and chromium and is specially advantageously carried out by addition of quicklime, slaked lime or lime-milk and by the method described in U.S. Patent No. 3,257,165. This specification describes a process for continuously purifying brine in a two-step process by consecutively adding lime and an alkali carbonate to continuously upward-flowing brine, whereby sludge formation occurs, the velocity of the brine which flows upward through the first reaction zone decreasing on account of the cross-section of the zone which widens upwardly and the addition of the brine occurring where sludge commences to settle out, the process involving the steps of (1) Continuously adding to the upward-flowing brine, in a first reaction zone and at a temperature between 50° C. and 100° C., lime in counter current flow, (2) Regulating the lime feed rate to maintain the pH value of the brine at least 10.0, at the place where the brine leaves the first reaction zone, (3) Regulating the flow velocity of the brine and the removal rate of the sludge to prevent sludge carry-over to the succeeding second reaction zone, (4) Adding, in a second reaction zone, an alkali carbonate in excess of the amount required for purification, and (5) Regulating the flow velocity of the brine in said second zone to prevent sludge removal therefrom. Brine purified by this process contains, in addition to sodium chloride, only sulfate, carbonate and hydroxyl ions, and traces of calcium ions; magnesium ions are detectable only by highly sensitive methods. The brine is then concentrated continuously in the conventional manner in an evaporating plant and the sodium chloride obtained is collected in a salt container. The salt is then separated from the mother liquor, which contains all the sulfate, carbonate and hydroxyl ions, and the mother liquor is then fed continously into the first zone of the brine purification plant. It is advantageous if the mother liquor is separated off in the apparatus described in British patent specification No. 1,058,582. The said apparatus is a device for the continuous removal of mother liquor from solid matter by means of a washing liquid and comprises a vertically arranged washing vessel into which the mother liquor containing solid matter can be introduced at the upper end and the washing liquor can be introduced at the lower end, which vessel is provided with at least one outlet conduit for solid matter and washing liquor in the lower section and at least one outlet conduit for mother liquor and washing liquor in the upper section. The washing apparatus is provided with a settling surface for the solid matter in the lower part of the vessel, which settling surface covers the greater part of the cross-sectional area of the vessel; the settling surface and at least one inlet conduit for the washing liquor being so arranged in relation to one another that the washing liquor flows against the settling surface. The fact that the washing process can be carried out in the salt container of the evaporator by use of the aforementioned arrangement is specially advantageous. Thus, evaporation and purification of the salt can be carried out continuously in one and the same apparatus.

Salt purified in this manner is advantageously made into a magma in the outlet conduit of the receiver by the addition of anolyte or saturated pure sodium chloride solution and transported in this state from the evaporating plant directly to the saturation plant. The highly purified sodium chloride is united with the spent brine in the saturation plant and the spent brine is thereby saturated. The saturated anolyte now contains sodium chloride of such purity that it may be run into the electrolytic cell without further chemical purification. If required or desired, a graphite filtration may be accomplished.

The chlorine dissolved in the spent brine leaving the cells is normally removed by a treatment with reduced pressure followed by blowing in air at least on part of the spent brine.

A concentration of sodium chlorate, calcium sulfate and sodium sulfate gradually builds up as a result of the electrolysis and the saturation of the spent brine with sodium chloride. In the process of the invention the spent brine can be purified in respect of its chlorate content in a simple manner outside the anolyte cycle by continuously subjecting, in general, only 0.3 to 2% by weight of the total amount of anolyte to a chlorate-removal process and then conveying it continuously or discontinuously either to the crude brine purifying plant or straight to the evaporating plant. As the result of this arrangement, the anolyte is constantly maintained at the degree of purity required for trouble-free operation. The plant for the production of pure sodium chloride need only be used for the purification of crude brine and a very small proportion of the spent brine.

The process of the invention and the ancillary processes belonging thereto are depicted in FIG. 2. Sequence 1 indicates purification, evaporation, and washing out outside the anolyte cycle, sequence 2 shows the anolyte cycle, sequence 3 shows the partial purification of the spent brine, sequence 4 shows the supply of sodium chloride solution for the preparation of a transportable magma and sequence 5 shows the purification of the mother liquor obtained in the evaporation process.

Thus, the process of the invention offers the great advantage that in areas where rock salt is not available but only salt in the dissolved state in the form of crude brine, the electrolysis can be carried out exclusively by the mercury cell process.

As compared with the processes used hitherto, the process of the invention also has the advantage that only simple apparatus is required, especially in respect of the scale and extent of the purification plant, and that trouble-free working is ensured as the result of an uninterrupted flow of pure brine into the electrolytic cell.

EXAMPLE

Crude brine

Crude brine having the following properties and composition is used:

| | | |
|---|---|---|
| Density ($d_4^{20}$) | | 1.196 to 1.201 |
| pH | | 6.7 to 7.2 |
| NaCl | g./l | 295 to 310 |
| $SO_4^{--}$ | g./l | 5.4 to 6.1 |
| $Ca^{++}$ | g./l | 1.0 to 1.2 |
| $Mg^{++}$ | g./l | 1.15 to 1.65 |
| $Al_2O_3$, $Fe_2O_3$ | g./l | Up to 0.15 |

Purification of crude brine

Purification of the crude brine is carried out by the process described in U.S. Patent No. 3,257,165. The apparatus corresponds to the arrangement depicted in FIG. 2 of the drawing accompanying said U.S. patent. The largest diameter of the container is 2930 millimeter and the total effective capacity is 17 cubic meters.

76 to 78 cubic meters of crude brine are purified continuously at 77 to 90° C. in the course of 24 hours. The following substances are used in this operation:

| | |
|---|---|
| CaO (in the dry state or in the form of $Ca(OH)_2$ or as milk of lime) | 4 to 7 kg./cubic meter of crude brine. |
| $Na_2CO_3$ (solution 110 g./liter) | 1.8 to 3.3 kg./cubic meter of crude brine. |
| $NaHCO_3$ (solution 85 g./liter) | 1.6 to 2.3 kg./cubic meter of crude brine. |

In addition to the above, 150 to 240 liters of mother liquor per cubic meter of crude brine are fed in continuously from the evaporating plant hereinafter described. The mother liquor contains 40 to 48 grams of $Na_2SO_4$, 3.2 to 4.8 grams of $Na_2CO_3$ and 0.5 to 1.5 grams of NaOH per liter. The mother liquor is saturated with sodium chloride at a temperature between 10 and 20° C.

Although the magnesium content of the crude brine is high and varies considerably, the purified brine flows continuously out of the purifying plant with a constant degree of purity. The purified brine leaving the plant is so clear that the clarifying filter connected to it and that has a surface area of 10 square meters has to be cleaned only every 5 or 10 days.

Brine purified in the aforesaid manner has the following composition:

| | | |
|---|---|---|
| $Na_2SO_4$ | g./liter | 7 to 11 |
| $Na_2CO_3$ | g./liter | 0.3 to 0.8 |
| NaOH | g./liter | 0.06 to 0.25 |
| NaCl | g./liter | 285 to 300 |
| $Ca^{++}$, $Mg^{++}$ | | Traces |

From 1 cubic meter of crude brine there are obtained 1.17 to 1.25 cubic meters of purified brine and 15 to 20 kg. of precipitated sludge ($CaSO_4$, $Mg(OH)_2$, $CaCO_3$) that contains 30 to 32% of water. The water-content of the sludge is so low that it converts into the solid state after only a few days. The precipitated $CaSO_4$ is transformed thereby into $CaSO_4.2H_2O$, a process which brings about the hardening of the sludge. The production of solid precipitates is highly advantageous because they can be tipped off into a pit without any deleterious effect. Alternatively, the sludge can be diluted with water while still soft and conveyed to an effluent clarification plant where it serves as an acid neutralizing agent.

The loss of sodium chloride, calculated on the salt-content of the crude brine and taking into account the water-content of the sludge, is only 0.5 to 0.8%.

Evaporating plant

The evaporation of the purified brine is carried out in a thermocompression evaporating plant which is operated by means of a horizontal, external heating chamber with forced circulation (system devised by Messrs. Escher, Wyss A. G. Zuerich). The evaporator has a useful volume of 18 cubic meters and a capacity of 1.8 tons of sodium chloride per hour. It operates at an internal pressure of 0.02 to 0.1 atmospheres (gauge). The bulk of the hot condensate from the heating chamber is cooled to 25 to 40° C. with the purified brine and crude brine by means of a system of heat exchangers having a total surface area of 108 square meters. In this system the crude brine is heated from 20° C. to a temperature within the range of 77° C. to 90° C. and the purified brine is heated to a temperature within the range of 102° C. to 110° C. 3.7 to 4 cubic meters of purified brine and 0.1 to 0.5 cubic meter of spent brine freed from chlorate and mercury ions are fed into the plant per hour. 0.45 to 0.70 cubic meter are taken from the resulting mother liquor hourly and, after dilution with a small quantity of water (~10%), are returned to the purifying plant. The $N_2SO_4$-content of the mother liquor in the evaporator is 45 to 55 grams per liter.

Washing out the salt

An apparatus similar to that depicted in FIG. 12 of patent application No. 30,800/63 is disposed in the salt bag of the evaporating plant. The salt bag is separated from the evaporating zone by means of a sieve. 500 liters of water obtained from the evaporator by condensation are fed into the centre section of the washing unit hourly, and 500 to 900 liters of purified brine from the anolyte cycle are fed into the lower section hourly. The condensed water and the sodium chloride crystals together with saturated purified brine and/or spent brine and/or purified spent brine form a salt magma which is pumped by means of a suitable pumping unit, into the saturation plant of the anolyte cycle. The $Na_2SO_4$-content of the purified brine from the anolyte cycle is 2 to 4 grams per liter and that of the brine transported with the salt magma is 1.0 to 3.2 grams per liter. As a rule, 5 to 10 kg., but not more than 20 kg. of $Na_2SO_4$ are fed into the anolyte cycle along with the salt and brine in the course of 24 hours.

Saturation

Under normal conditions 22 to 24 tons of solid salt are fed into the saturation plant in the course of 24 hours. The grain size of the salt is 90 to 95% between test sieves having mesh widths of 1.0 and 0.315 (DIN 4188). The saturation plant also serves as a store for the solid salt, it being possible to store up to 350 tons of salt covered by the anolyte for a period of several months without agglomeration occurring.

Most of the dechlorinated spent brine, which has a temperature of 60 to 66° C. and a density of 1.180 at 20° C. is passed through the saturation plant; a proportion of it bypasses the latter. This ensures that the density of the total amount of purified brine does not exceed 1.200 at 20° C., a value which corresponds to a sodium chloride content of about 300 grams per liter.

Before the saturated purified brine is conveyed to the cells it is passed through a clarifying filter. This frees the saturated and purified brine from a slight turbidity due to suspended graphite. The filter used has a surface area of 50 square meters and is cleaned by rinsing every 24 to 60 hours only.

Electrolysis

The mercury unit in which the electrolysis is carried out comprises 18 baths each having a cathode surface area of 5 cubic meters (system devised by Uhde, Dortmund). The operating current is 24,000 amps, and the mean operating voltage per bath is 4.2 to 4.5 v.

Dechlorination

The spent brine leaving the cells (24 to 28 cubic meters per hour) contains 250 to 300 milligrams per liter of active chlorine. The temperature is 70 to 78° C. The spent brine is first freed from chlorine with the aid of a vacuum plant, whereupon dechlorination is completed by blowing in air. The spent brine thus freed from chlorine and still contains between 4 and 10 milligrams of active chlorine per liter is neutralized to pH 7 with $Na_2CO_3$ and NaOH solution and cooled to 65° C. with the aid of a cooling device.

The dechlorinated and neutralized spent brine has the following composition, the amounts being in milligrams and grams per liter:

NaClO₃ _____ milligrams__ 200 to 600
Na₂SO₄ _____ grams__ 2 to 4
CaO _____ milligrams__ 20 to 80
No magnesium and no iron.

Removal of chlorate 100 to 500 liters of dechlorinated but not yet neutralized spent brine (pH <2, 5) are conveyed hourly and continuously into the chlorate removal plant. 0.5 to 2.5 liters of a solution containing 400 to 480 grams of NaHSO₃ per liter are added to this spent brine hourly. The amount added depends on the NaClO₃-content. The reaction is carried out in a vessel of 2 cubic meters capacity at at least 50° C. In the outgoing solution it must not be more than 50 to 150 milligrams per liter of SO₂ present. The SO₂ is then completely removed in a packed column (3 meters high and 30 centimeters in diameter) by blowing in air at a rate of 4 to 8 cubic meters per hour in counter-current to the solution. The solution thus freed from chlorate and SO₂ is passed over a container filled with limestone whereby the acid is neutralized. 1 to 3 grams per liter of sodium carbonate solution and 0.5 to 1 gram per liter of NaOH of 30% strength are added hourly in the precipitation and decantation container into which the solution passes on leaving the limestone container. The precipitated CaCO₃ carries traces of mercury ions with it so that the solutions thus treated can be considered non-corrosive and can thus be fed into the evaporator without danger.

Output of the plant

The output in a 24-hour period is 15.2 tons of NaOH (100% strength), 13.6 tons of chlorine gas and 4800 to 4900 cubic meters of hydrogen. The amount of crude brine required for this output is 76 to 79 cubic meters.

The NaOH is obtained in the form of a solution of 50% strength and contains less than 0.02% of NaCl. The hydrogen content of the chlorine is 0.2 to 0.4% by volume. The hydrogen has a degree of purity of more than 99.95%.

Yield and current efficiency

The yield of NaOH, calculated on the NaCl content of the crude brine is 96 to 98%, and the current efficiency is 97 to 98%.

What is claimed is:

1. A process for the manufacture of chlorine, sodium hydroxide and hydrogen by the electrolysis of aqueous sodium chloride solution, which comprises
    (a) using crude brine as starting material and performing electrolysis exclusively in a mercury cell, having an associated anolyte cycle including a brine saturation plant,
    (b) treating the crude brine continuously in a purifying stage first with lime and then with alkali metal carbonate in order to remove magnesium, iron and calcium and a part of the sulfate ions,
    (c) continuously concentrating the so purified brine in an evaporation stage to precipitate sodium chloride,
    (d) continuously washing the precipitated sodium chloride with a small amount of water at the bottom of the evaporating apparatus in order to remove sulphate ions,
    (e) continuously recycling the mother liquor of (c) to the purifying stage (b),
    (f) conveying continuously the sodium chloride of (d) from the evaporator to the saturation plant by means of a part of purified brine of the anolyte cycle and resaturating the spent brine in the saturation plant,
    (g) treating continuously a small amount of spent brine freed from chlorine to remove chlorate and mercury ions and introducing it continuously into at least one of said stages, and
    (h) submitting the saturated purified brine to electrolysis without further purification of the purified brine.

2. A process as claimed in claim 1, which comprises purifying the crude brine in a process for continuously purifying brine in a two-step process by consecutively adding lime and an alkali metal carbonate to continuously upward-flowing brine, whereby sludge formation occurs, the velocity of the brine which flows upward through the first reaction zone decreasing on account of the cross-section of the zone which widens upwardly, the addition of the brine occurring where sludge commences to settle out, the steps of
    (1) continuously adding to the upward-flowing brine, in a first reaction zone and at a temperature between 50 and 100° C., lime in counter current flow,
    (2) regulating the lime feed rate to maintain the pH value of the brine at at least 10.0, at the place where the brine leaves the first reaction zone,
    (3) regulating the flow velocity of the brine and the removal rate of the sludge to prevent sludge carry-over to the succeeding second reaction zone,
    (4) adding, in a second reaction zone, an alkali metal carbonate, in excess of the amount required for purification, and
    (5) regulating the flow velocity of the brine in said second zone to prevent sludge removal therefrom.

3. A process as claimed in claim 1 which comprises concentrating the purified brine by evaporation and washing the precipitated sodium chloride with the aid of a device for the continuous removal of undesired liquid from solid matter by means of a washing liquid, which device comprises a vertically arranged washing vessel into which the solid matter contaminated with undesired liquid can be introduced at the upper end and the washing liquid can be introduced at the lower end, which vessel is provided with at least one outlet conduit for solid matter and washing liquid in the lower section and at least one outlet conduit for undesired liquid and a washing liquid in the upper section, and which is also provided with a settling surface for the solid matter in the lower section, which settling surface covers the greater part of the cross-sectional area of the vessel, the settling surface and at least one inlet conduit for the washing liquid being so arranged in relation to one another that the washing liquid flows against the settling surface.

References Cited

UNITED STATES PATENTS 2,836,551   5/1958   Heller et al. _____ 204—99
2,902,418   9/1959   Burns _____ 204—128
2,949,412   8/1960   Neipert et al. _____ 204—99
3,052,612   9/1962   Henegar et al. _____ 204—128
3,329,595   7/1967   Barbato et al. _____ 204—99

HOWARD S. WILLIAMS, *Primary Examiner.*

D. R. JORDAN, *Assistant Examiner.*